(12) United States Patent
Mika et al.

(10) Patent No.: US 10,551,911 B2
(45) Date of Patent: Feb. 4, 2020

(54) ANALYSING DEVICE FOR DETERMINING A LATENCY TIME OF AN IMMERSIVE VIRTUAL REALITY SYSTEM

(71) Applicant: PSA AUTOMOBILES SA, Poissy (FR)

(72) Inventors: Matthieu Mika, St. Germain de la Grange (FR); Christophe Mion, Jarville la Malgrange (FR)

(73) Assignee: PSA Automobiles SA, Poissy (FR)

( * ) Notice: Subject to any disclaimer, the term of this patent is extended or adjusted under 35 U.S.C. 154(b) by 0 days.

(21) Appl. No.: 16/477,090

(22) PCT Filed: Jan. 25, 2018

(86) PCT No.: PCT/FR2018/050170
§ 371 (c)(1),
(2) Date: Jul. 10, 2019

(87) PCT Pub. No.: WO2018/142044
PCT Pub. Date: Aug. 9, 2018

(65) Prior Publication Data
US 2019/0354167 A1  Nov. 21, 2019

(30) Foreign Application Priority Data

Feb. 1, 2017 (FR) ..................... 17 50820

(51) Int. Cl.
*G06F 3/01* (2006.01)
*G06T 7/70* (2017.01)
(52) U.S. Cl.
CPC ............. *G06F 3/011* (2013.01); *G06T 7/70* (2017.01); *G06T 2207/10048* (2013.01)

(58) Field of Classification Search
CPC .. G06F 3/011; G06T 7/70; G06T 2207/10048
See application file for complete search history.

(56) References Cited

U.S. PATENT DOCUMENTS 9,767,576 B2 * 9/2017 Menozzi ................. G06F 1/163
9,928,661 B1 * 3/2018 Kinstner ................. A63F 13/00
(Continued)

FOREIGN PATENT DOCUMENTS

CA          2662318 A1      7/2010

OTHER PUBLICATIONS

Mark R Mine: Characterization of End-To-End Delays in Head-Mounted Display Systems; 1993, XP055389555, Figure 3, paragraph [03.0].

(Continued)

*Primary Examiner* — Sarah Lhymn
(74) *Attorney, Agent, or Firm* — Sandberg Phoenix & von Gontard, P.C.

(57) ABSTRACT

A device (DA) analyses an immersive virtual reality system (SI) comprising a target (CD) that is securely fastened to an object (OM), detecting means (MD) that deliver a first signal representative of the current position of the target (CD), processing means (MT) that define images depending on the detected current position, and at least one image-displaying means (EA, PI). This device (DA) comprises a first sensor (C1) that generates a second signal when the object (OM) reaches a known position, a second sensor (C2) that generates a third signal when it detects a change in displayed image consecutive to the detection of the object (OM) in this known position by the detecting means (MD), and analysing means (MA) that determine first and second times of reception of the second and third signals then a first time difference between these first and second times of reception.

9 Claims, 2 Drawing Sheets

(56) References Cited

U.S. PATENT DOCUMENTS

| 10,007,350 | B1* | 6/2018 | Holz ..................... G06F 3/017 |
| 2015/0097803 | A1 | 4/2015 | Leigh et al. |
| 2016/0044298 | A1* | 2/2016 | Holz ..................... H04N 5/332 |
| | | | 348/47 |
| 2017/0106277 | A1* | 4/2017 | Perdigon Rodriguez ................... |
| | | | G06F 3/011 |
| 2018/0035886 | A1* | 2/2018 | Courtemanche ......... A61B 5/16 |
| 2019/0079480 | A1* | 3/2019 | Sun ..................... G06F 3/011 |
| 2019/0121515 | A1* | 4/2019 | Nashida ................. G06F 3/01 |
| 2019/0206134 | A1* | 7/2019 | Devam .................. G06F 3/011 |

OTHER PUBLICATIONS

International Search Report for PCT/FR2018/050170 dated Jun. 5, 2018.
Written Opinion for PCT/FR2018/050170 dated Jun. 5, 2018.

\* cited by examiner

ANALYSING DEVICE FOR DETERMINING A LATENCY TIME OF AN IMMERSIVE VIRTUAL REALITY SYSTEM

CROSS-REFERENCE TO RELATED APPLICATIONS

This application is the U.S. National Stage under 35 USC § 371 of International Application No. PCT/FR2018/050170, filed 25 Jan. 2018 which claims priority to French Application No. 1750820 filed 1 Feb. 2017, both of which are incorporated herein by reference.

BACKGROUND

The invention relates to immersive virtual reality systems.

As is known to those skilled in the art, immersive virtual reality systems are used more and more often in order to immerse users in virtual environments. This is the case particularly in, although not limited to, the field of vehicles, possibly of the automobile type. Such an immersion can be intended, for example, to teach a user to develop in a particular environment or to use objects or functions present in a particular environment, or to analyze the behavior of a user in a particular environment, or to observe a particular environment depending on the position of a user in relation thereto.

Usually, an immersive (virtual reality) system comprises:
at least one target capable of being connected to a user (or sometimes an object) which is capable of moving in a predefined space,
detecting means capable of detecting the current position of this target in this predefined space and of delivering a signal representative of this current position,
at least one displaying means responsible for displaying on at least one screen, installed in the predefined space, images (possibly three-dimensional (or 3D)) intended for this screen, and
processing means responsible for defining in real time for each associated screen three-dimensional (possibly stereoscopic) images of a chosen environment, depending on the current position of the at least one target and on the position of the associated screen in the predefined space.

When a user uses such an immersive system, he quickly notices that there is a time difference or delay between the moment when he changes position and the moment when he sees each image that results from his change of position on each screen. This time difference or delay, commonly referred to as latency time, results from the processing times of the signals and data, the transmission times of the signals, data and images, the graphics rendering time of the computers and the time difference between the moment when the user finds himself placed in a new position and the moment when the detecting means detect the target (and therefore the user) in this new position.

Usually, the longer the latency time, the more uncomfortable the user, and the user may even suffer from nausea, dizziness or loss of balance. It is therefore important to know the (overall) latency time of an immersive system and, if possible, the main parameters that contribute thereto, if we wish to reduce the latency time to a value that is not uncomfortable for the user (i.e. that tends towards zero). Known solutions that enable the latency time to be determined, such as the one described for example in US Pub. No. 2015/097803, are not sufficiently precise and do not enable the main contributory parameters to be known.

SUMMARY

The particular object of the invention is therefore to improve the situation.

In particular to this end an analyzing device is disclosed which is intended to perform analyses in an immersive virtual reality system. The analyzing device comprises:
at least one target capable of being connected to an object capable of moving in a space,
detecting means capable of detecting the current position of this target in this space and of delivering a first signal representative of this current position,
at least one displaying means capable of displaying on at least one screen, installed in the predefined space, images intended for this screen, and
processing means capable of defining images for this screen depending on the detected position of the object.

This analyzing device further comprises:
the object equipped with each target,
a first sensor capable of generating a second signal when the object reaches a known position in this space,
a second sensor capable of generating a third signal in the event of the detection of a change in displayed image on the screen subsequent to the detection of the object in this known position by the detecting means, and
analyzing means connected at least to the first and second sensors and capable of determining a first moment of reception of the second signal and a second moment of reception of the third signal, then of determining a first time difference (or latency time) between the first and second determined moments of reception.

It is thus possible to quantify very precisely the overall latency time (or first time difference) of the immersive system.

The analyzing device can have other characteristics that can be taken separately or in combination, namely:
its analyzing means can also be connected to the detecting means and processing means, and be capable of determining a third moment of reception of a first signal representative of the known position detected by the detecting means, and a second time difference between the first and third determined reception moments, this second time difference being representative of a delay in detecting the target in the known position by the detecting means;
the analyzing means can be capable of determining a third time difference between the first and second determined time differences, this third time difference being representative of at least one duration of image generation by the processing means in the event of a change of image;
the second sensor can be capable of detecting a variation in light intensity resulting from a change of image displayed on the screen;
the analyzing device can comprise a rail on which the object is capable of moving and which is capable of being placed in the space so that the object can move to the known position;
the rail can comprise a support on which the rail is fixedly connected;
the rail can be connected to the support so as to be inclined at a predefined acute angle in relation to a horizontal plane of the space, and thus enable an automatic movement under gravity of the object in relation to the rail between a starting position and at least the known position;

the rail can comprise electromagnetic means fixedly installed on the rail and capable, on one hand, of immobilizing the object in the starting position when it is placed in a first magnetically attractive state and, on the other, of releasing the object, so that it can move towards the known position, when it is placed in a second magnetically non-attractive state;

the first sensor can be capable of being placed in the vicinity of the known position and of generating the second signal when the object makes contact with it.

An immersive virtual reality system is also proposed, the system comprising at least one target capable of being connected to an object capable of moving in a space, detecting means capable of detecting the current position of the target in this space and of delivering a first signal representative of this current position, at least one displaying means responsible for displaying on at least one screen, installed in the predefined space, images intended for the screen depending on at least this detected current position, and an analyzing device of the type described above.

DESCRIPTION OF THE FIGURES

Further features and advantages of the invention will emerge from the following detailed description and the accompanying drawings, in which.

DETAILED DESCRIPTION

The main object of the invention is to propose an analyzing device DA intended for performing analyses in an immersive virtual reality system SI in order to determine at least the overall latency time $et1$ of the immersive virtual reality system.

By way of non-limiting example, the immersive virtual reality system will henceforth be regarded as being intended to immerse a user in a virtual environment representative of at least one part of a vehicle, possibly of the automobile type (such as a car, for example). But the invention is not limited to this type of virtual environment. In fact, it concerns any type of virtual environment.

Figure 1:
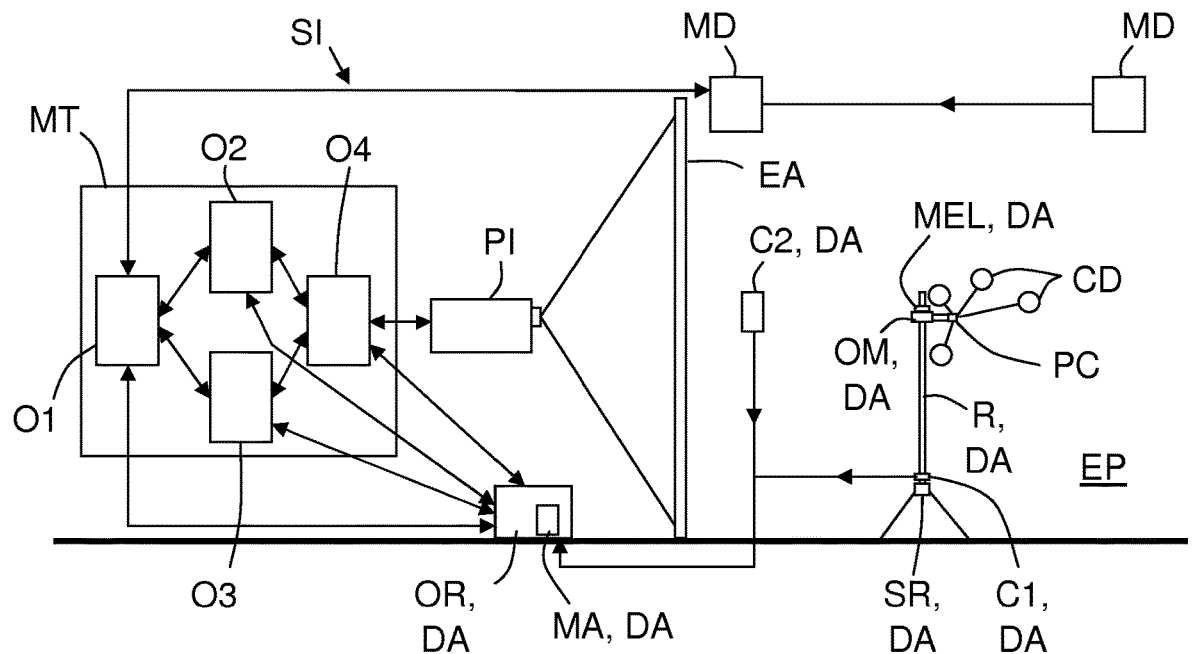
FIG. 1 is a schematic and operational representation of an example of an immersive virtual reality system connected to an embodiment of an analyzing device.

FIG. 1 is a schematic representation of an example of an immersive (virtual reality) system SI associated with a predefined space EP wherein an embodiment of an analyzing device DA is at least partially installed.

As shown, an immersive (virtual reality) system SI comprises at least one target CD, detecting means MD, processing means MT, and at least one displaying means PI, EA.

Each target CD is capable of being connected to a user (or sometimes an object OM of the analyzing device DA) who is capable of moving in a predefined space EP.

The detecting means MD is capable of detecting the current position of each target CD in the predefined space EP and of delivering a first signal $s1$ that is representative of this current position.

Each screen EA is installed in the predefined space EP.

The processing means MT is responsible for defining in real time for each associated screen EA the possibly three-dimensional (and possibly stereoscopic) images of a chosen environment, depending on the detected position of the object OM (depending on the current position of the/each target CD) and the position of the associated screen EA in the predefined space EP.

During an analysis performed by the analyzing device DA, the processing means MT is responsible, at the request of the analyzing device, for defining for each associated screen EA a first image provided that the object OM has not been detected by the detecting means MD in a known position $p2$ in the space EP (see FIG. 3), and a second image when the object OM has been detected by the detecting means MD in this known position $p2$. By way of non-limiting example, the first image can be completely white and the second image can be completely black.

Each displaying means PI, EA is responsible for displaying on at least one screen EA, installed in the predefined space EP, images that are intended for this screen EA. It will be noted that each displaying means can comprise a screen EA and at least one projector PI, or a screen EA and an LCD-type panel with its associated electronic control means, for example.

The number of screens EA usually ranges between one and five. Each screen EA is installed in the predefined space EP. At least one computer is responsible for defining, in real, time three-dimensional (possibly stereoscopic) images of the chosen environment for at least one screen EA that is associated with it, depending on the current position of the targets CD (possibly a target-holder PC) and the position of this associated screen EA in the predefined space EP. In the presence of projector(s) PI, each projector is responsible for projecting onto the associated screen EA three-dimensional images determined by the associated computer and intended for this screen EA.

In the non-limiting example shown in FIG. 1, the immersive system SI has only one displaying means comprising a screen EA associated with a projector PI. But it could have several (at least two) displaying means PI, EA. Furthermore, each displaying means is generally associated with its own processing means MT. But it could be envisioned that the same processing means (if powerful enough) could define images for several (at least two) displaying means.

Preferably, and as shown by way of non-limiting example in FIG. 1, the immersive system comprises several targets fixedly connected to a target-holder PC intended to be connected to a user or an object OM of the analyzing device DA that can move in the predefined space EP. It will be noted that the target-holder PC here comprises four targets CD, the positions of which must be determined at each measuring moment by the detecting means MD in order to deduce at each measuring moment the current position of the object OM. But the target-holder PC can comprise any number of targets CD, as long as this number is at least equal to one (1).

For example, the detecting means MD here comprises two cameras each associated with an emitter of infrared photons and capable of filming in infrared. Each emitter emits an infrared beam that will reflect on the targets (or spheres) CD. Each camera records images of the photons reflected on the targets (or spheres) CD, and sends each recorded image to an image-analyzing computer that will deduce the position in the space of the target-holder PC at the moment in question. But the detecting means MD could comprise more than two cameras.

It will also be noted, as shown in a non-limiting example in FIG. 1, that the processing means MT can be subdivided into several parts (four here (O1-O4)), when they have to define stereoscopic 3D images for at least one displaying means (here a projector PI associated with a screen EA). The second part O2 can be a computer responsible for defining the images for the left eye. The third part O3 can be a computer responsible for defining the images for the right eye. The fourth part O4 can be a computer responsible for transmitting in a synchronized manner to the display means (here a projector PI associated with a screen EA) the images defined by the second OR2 and third OR3 parts depending on the same current position detected by the detecting means MD. The first part O1 can be a computer connected to the detecting means MD and, here, to the second O2 and third O3 computers, and responsible for controlling these second O2 and third O3 computers depending on the current positions detected by the detecting means MD.

Figure 2:
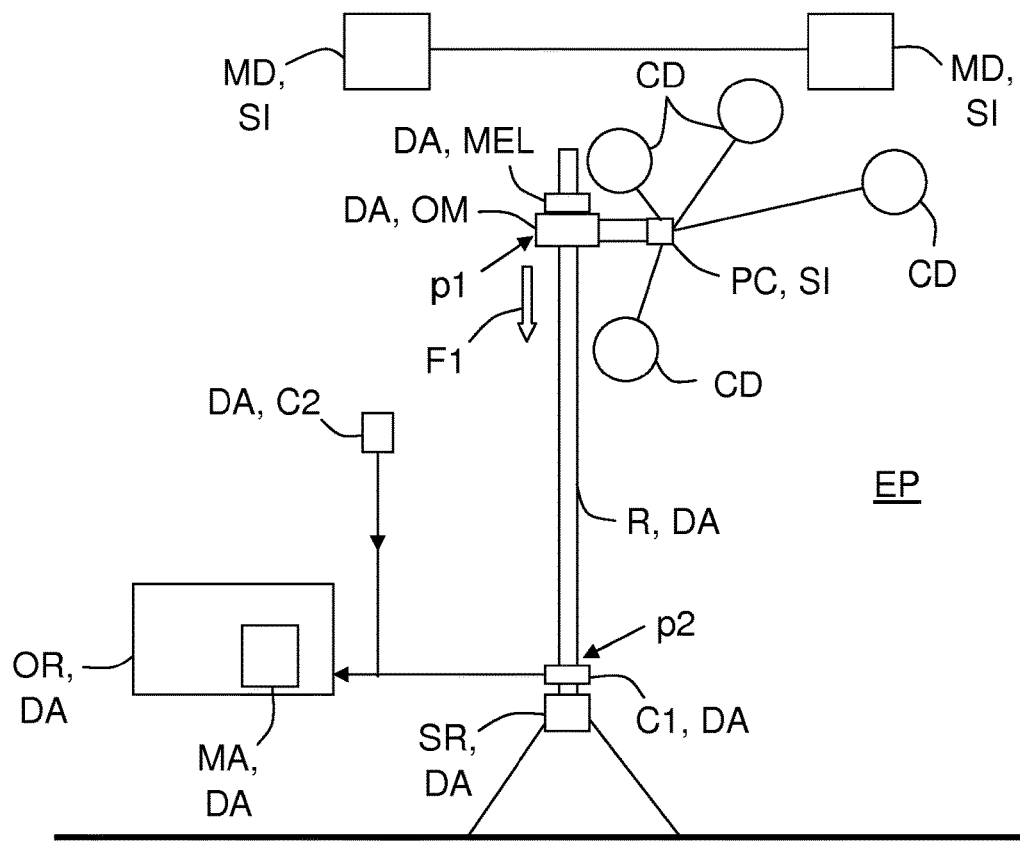
FIG. 2 is a schematic and operational representation of the analyzing device of FIG. 1 with its object to be detected placed in a starting position.
Figure 3:
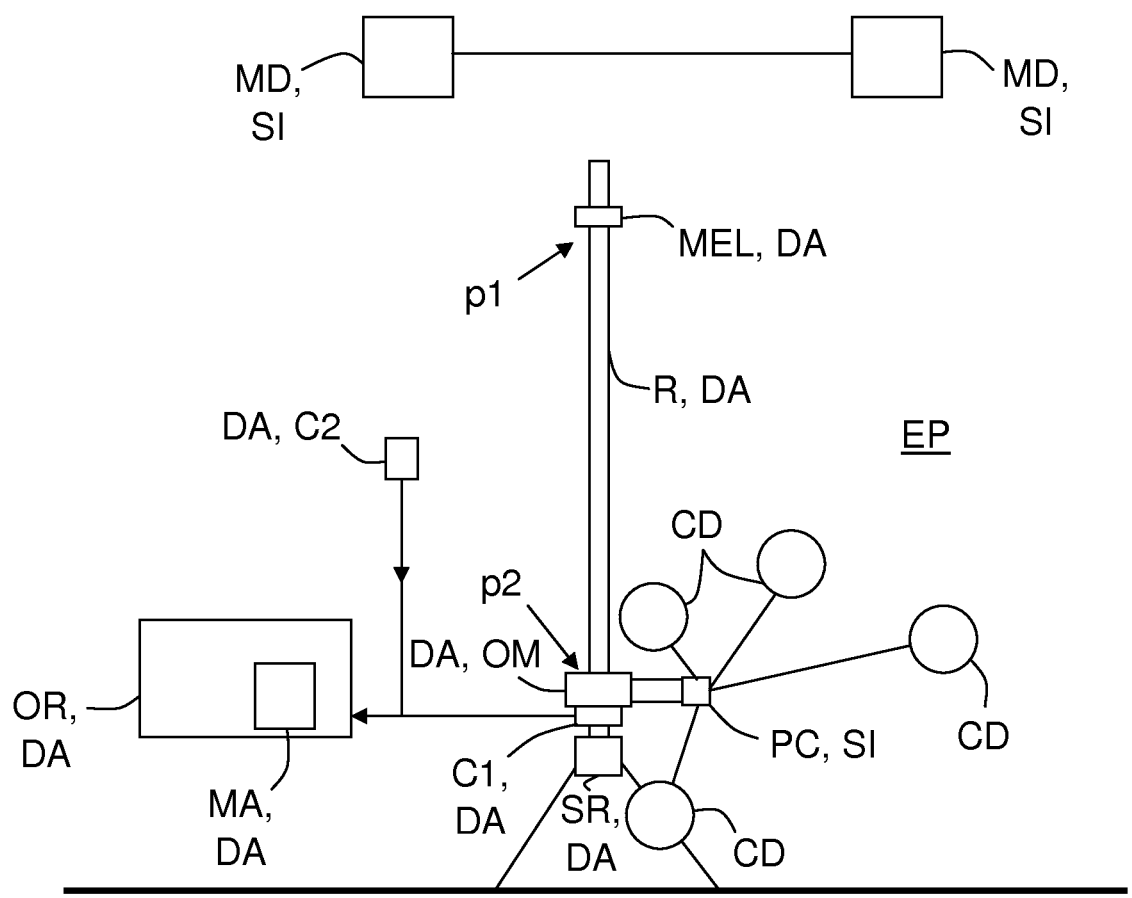
FIG. 3 is a schematic and operational representation of the analyzing device of FIG. 1 with its object to be detected placed in a known (final) position.

As shown by way of non-limiting example in FIGS. 1 to 3, an analyzing device DA according to the invention comprises, in addition to the object OM, at least one first sensor C1, one second sensor C2 and analyzing means MA.

For example, at the beginning of an analysis, the analyzing device DA can inform the processing means MT so that it defines for each associated screen EA the first image provided that the object OM has not been detected by the detecting means MD in the known position p2, and a second image when the object OM has been detected by the detecting means MD in this known position p2.

The object is mobile so that it can move in the (predefined) space EP. Moreover, as stated above, it must be equipped with at least one target CD, possibly forming part of a target-holder PC (as shown in the non-limiting example in FIGS. 1 to 3).

The first sensor C1 is capable of generating a second signal s2 when the object OM reaches a known position p2 in the space EP (see FIG. 3).

This first sensor C1 can, for example and as shown in the non-limiting example in FIGS. 1 to 3, be capable of being placed in the vicinity of the known position p2 and of generating the second signal s2 when the object OM comes into contact with it. For this purpose, it can, for example, be of the piezoelectric or capacitive or inductive or even mechanical type. But in one variation, detection can be achieved without contact (and therefore remotely), for example by interrupting a beam of light passing through the known position p2.

The second sensor C2 is capable of generating a third signal s3 in the event of detecting a change in a displayed image on the screen EA. "Change in a displayed image" here means the replacement of a first image by a second image that can be immediately differentiated from the first by at least one characteristic. For example, when the first image is all white and the second image is all black, the second sensor C2 can generate a third signal s3 when it detects on the screen EA the transition from white to black.

This second sensor C2 can, for example, be capable of detecting a variation in light intensity resulting from a change in the displayed image on the screen EA. For this purpose, it may be a photodiode that delivers a signal s3 only when it detects white only.

The analyzing means MA is connected at least to the first C1 and second C2 sensors, and preferably also to the detecting means MD and processing means MT. The analyzing means is capable of determining a first moment i1 of reception of the second signal s2 (generated by the first sensor C1), and a second moment i2 of reception of the third signal s3 (generated by the second sensor C2), then of determining a first time difference et1 between these first i1 and second i2 determined moments of reception (i.e. et1=i1−i2).

This first time difference et1 constitutes the overall latency time of the immersive system SI as it is equal to the difference between the moment i1 when the object OM (representing a user) changes position (here it is detected in p2 by the first sensor C1) and the moment i2 when the new (or second) image (for example all black and representing the image resulting from the detection of the object OM in p2 by the detecting means MD) is displayed on the screen EA.

It will be understood that the known position p2 serves as a reference position relative to which the analysis means MA determines the first time difference (or overall latency time) et1.

For example, when the analyzing means MA receives at one moment a second signal s2 generated by the first sensor C1, it records this moment as the first moment i1, and when it receives at one moment a third signal s3 generated by the second sensor C2, it records this moment as the second moment i2.

During an analysis, triggering of the change of image is performed automatically by the processing means MT (here the first part O1) when it receives from the detecting means MD a first signal s1 representative of the detected known position p2 for the object OM.

In the non-limiting example shown in FIGS. 1 to 3, the analyzing means MA forms part of a computer OR that is connected (directly or indirectly) to the first C1 and second C2 sensors and to the detecting means MD (here via the first computer O1 of the processing means MT of the immersive system SI). But this is not compulsory. In fact, in a variation, the analyzing means could be in the form of electronic equipment (for example comprising an oscilloscope and an electronic signal analyzing circuit) connected (directly or indirectly) to the first C1 and second C2 sensors and to the detecting means MD of the immersive system SI. In another variation, the analyzing means MA could be implanted in the processing means MT (for example in the first computer O1 that is connected to the detecting means MD). Consequently, these analyzing means MA can be made in the form of software or computer modules (or software), or a combination of electronic circuits (or hardware) and software modules.

It will be noted that when the analyzing means MA is connected to the detecting means MD and processing means MT, it can also be capable of determining a third moment i3 of reception of the first signal s1 that is representative of the detected known position p2. For example, when the analyzing means MA receives at one moment a first signal s1 that represents the detected known position p2, it records this moment as a third moment i3. In this case the analyzing means MA is also capable of determining a second time difference et2 between the first i1 and third i3 determined moments of reception.

This second time difference et2 is representative of the delay in detecting the target CD in the known position p2 by the detecting means MD. In fact, the moment i1 is the moment when the object OM (which represents a user moving in the space EP) is placed in a "new position" (here p2) and moment i3 is the moment when the detecting means MD detects the target(s) CD (and thus the object OM) in this new position (here p2). This second time difference et2 is particularly useful to know because it contributes significantly to the overall latency time of the immersive system SI.

It will also be noted that the analyzing means MA can also be capable of determining a third time difference et3 between the first et1 and second et2 determined time differences. This third time difference et3 is representative of at least the duration of image generation by the processing means MT in the event of an image change (i.e. following the reception of the first signal s1 representative of p2). This third time difference et3 is also useful to know because it makes a significant contribution to the overall latency time of the immersive system SI.

It will also be noted that the analyzing means MA can also and possibly be informed by each of parts O1 to O4 of the processing means MT of a signal or instructions or a data file and/or of the transmission of a signal or instructions or a data file to another piece of equipment of the immersive system SI. This allows the intermediate processing times to be deduced, which also affect the overall latency time of the immersive system SI. Thus, all of the contributions to the overall latency time of the immersive system SI can be known.

The movement of the object OM can be performed in different ways.

Thus, the analyzing device DA can, for example, comprise a rail R along which the object OM is capable of moving and which is capable of being placed in the space EP so that the object OM can move to the known position p2. In this case, the movement of the object OM is limited. It will be noted that this rail R can be a simple rod, possibly but not necessarily of circular cross-section.

For example, and as shown in the non-limiting example in FIGS. 1 to 3, the analyzing device DA can also comprise a support SR on which the rail R is fixedly connected.

Such a support SR can, for example, be intended to be placed on the ground in the space EP. It can therefore enable the rail R to be placed in a position parallel to the ground or inclined at a predefined acute angle relative to the ground and thus relative to a horizontal plane of the space EP (as shown in the non-limiting example in FIGS. 1 to 3).

In the first alternative (with the rail parallel to the ground), in order for the object OM to move from a starting position towards the known position p2, it must either receive an initial push by a person or be fitted with an electric motor preferably having an operation that can be remotely controlled (by gestures, for example).

In the second alternative (with the rail inclined relative to the ground), the movement of the object OM relative to the rail R can be made automatically by gravity between a starting position p1 (shown in FIGS. 1 and 2) and at least the known position p2 (shown in FIG. 3). In other words, the movement results from the object OM falling down the rail R (in the direction of the arrow F1 in FIG. 2).

It will be noted that in the non-limiting example shown in FIGS. 1 to 3, the angle of inclination of the rail R relative to the ground (horizontal here) is equal to 90°. This allows a simple support SR, for example a tripod, to be used. But this angle could be less than 90°, and for example equal to 45° or 60°.

It will also be noted, as shown in the non-limiting example in FIGS. 1 to 3, that in the second (inclined) alternative, the analyzing device DA can comprise electromagnetic means MEL installed fixedly on the rail R near the starting position p1. This electromagnetic means MEL is capable, on the one hand, of immobilizing the object OM in its starting position p1 when the electromagnetic means is placed in a first magnetically attractive state and, on the other, of releasing the object OM, so that it can move towards the known position p2 when it is placed in a second magnetically non-attractive state. This electromagnetic means MEL can, for example, be arranged in the form of an electromagnet which is magnetically attractive when it is supplied with power and magnetically non-attractive when it is not supplied with power. It will be noted that if the electromagnet is sufficiently powerful, it can also be used, when it is supplied with power, to lift the object OM automatically from the known position p2 to its starting position p1.

Such electromagnetic means MEL can, for example, have an operation that can be remotely controlled, possibly by means of gestures. This control can be via a computer connected to the electromagnetic means MEL, and which is possibly the computer OR which can comprise the analyzing means MA, or via a remote control. This in fact allows a user to trigger the fall of the object OM remotely without the risk of hampering the continuance of its detection as it falls by the detecting means MD.

It will be noted in the non-limiting example shown in FIGS. 1 to 3, that the first sensor C1 is fixedly connected to rail R just below the known position p2 because this first sensor C1 ensures detection by contact.

It will also be noted that the movement of the object OM is not compulsorily limited because it is connected to a rail R, for example. In fact, in a variation it can be envisioned that the object OM is arranged so as to roll along the ground of the space EP. For example, it can have wheels that may be driven in rotation by an electric motor.

In the absence of an electric motor, the object OM moves from a starting position to the known position p2 by means of an initial push by a person. In the presence of an electric motor, the operation thereof causes the movement of the object OM from a starting position to the known position p2. This operation is then preferably remotely controlled (possibly by gestures). This control can be achieved via a computer that is connected to the object OM and is possibly the computer OR that can comprise analyzing means MA, or via a remote control.

The object OM can have a very large number of layouts, depending chiefly on the way in which it must move. By way of example, it can be made in the form of a part (possibly of metal) of a general parallelepiped form, either with a groove or connecting means suitable for its movement along a rail R, or with wheels. The movements could also be made on an air cushion, for example.

The invention claimed is:
1. An immersive virtual reality system comprising
   i) at least one target capable of being connected to an object capable of moving in a space,
   ii) detecting means capable of detecting a current position of said target in said space and of delivering a first signal representative of the current position,
   iii) at least one displaying means responsible for displaying on at least one screen, installed in said predefined space, images intended for said at least one screen, and
   iv) processing means responsible for defining images for said at least one screen depending on at least said detected current position,
   v) a first sensor capable of generating a second signal when the object reaches a known position in said space,
   vi) a second sensor capable of generating a third signal in the event of detection of a change in an image displayed on said screen, subsequent to the detection of said object in the known position by said detecting means, and vii) an analyzing means connected at least to said first and second sensors and capable of determining a first moment of reception of said second signal and a second moment of reception of said third signal, then of determining a first time difference between said first and second determined moments of reception.

2. The immersive virtual reality system according to claim 1, wherein said analyzing means is also connected to said detecting means and processing means, and is capable of determining a third moment of reception of a first signal representative of said known position detected by said detecting means, and a second time difference between said first and third determined reception moments, the second time difference being representative of a delay in detecting said target in said known position by said detecting means.

3. The immersive virtual reality system according to claim 2, wherein said analyzing means is capable of determining a third time difference between said first and second determined time differences, the third time difference being representative of at least one duration of image generation by said processing means in the event of a change of image.

4. The immersive virtual reality system according to claim 1, wherein said second sensor is capable of detecting a variation in light intensity resulting from a change of image displayed on said screen.

5. The immersive virtual reality system according to claim 1, wherein said immersive virtual reality system comprises a rail on which said object is capable of moving and which is capable of being placed in said space so that said object can move to said known position.

6. The immersive virtual reality system according to claim 5, wherein said immersive virtual reality system comprises a support on which said rail is fixedly connected.

7. The immersive virtual reality system according to claim 6, wherein said rail is connected to said support so as to be inclined at a predefined acute angle in relation to a horizontal plane of said space, and thus enable an automatic movement by gravity of said object in relation to said rail between a starting position and at least said known position.

8. The immersive virtual reality system according to claim 7, wherein said immersive virtual reality system comprises electromagnetic means fixedly installed on said rail and capable i) of immobilizing said object in said starting position when said electromagnetic means is placed in a first magnetically attractive state and ii) of releasing said object, so that said object can move towards said known position, when said electromagnetic means is placed in a second magnetically non-attractive state.

9. The immersive virtual reality system according to claim 1, wherein said first sensor is capable of being placed in a vicinity of said known position and of generating said second signal when said object makes contact with it.

* * * * *